United States Patent
Yokoyama

(10) Patent No.: US 11,292,438 B2
(45) Date of Patent: Apr. 5, 2022

(54) FRICTION BRAKE AND VEHICLE-MOUNTED APPARATUS

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 158 days.

(21) Appl. No.: 16/502,853

(22) Filed: Jul. 3, 2019

(65) Prior Publication Data

US 2020/0062224 A1 Feb. 27, 2020

(30) Foreign Application Priority Data

Aug. 24, 2018 (JP) .............................. JP2018-157198

(51) Int. Cl.
*B60T 1/06* (2006.01)
*B60K 7/00* (2006.01)
(Continued)

(52) U.S. Cl.
CPC ............. *B60T 1/065* (2013.01); *B60K 7/0007* (2013.01); *F16C 19/16* (2013.01); *F16D 55/226* (2013.01); *F16D 65/0081* (2013.01); *F16D 65/092* (2013.01); *F16D 65/186* (2013.01); *F16D 65/853* (2013.01); *B60K 2007/0061* (2013.01);
(Continued)

(58) Field of Classification Search
CPC .......... B60T 1/065; H02K 7/102; H02K 9/19; H02K 7/116; H02K 7/1028; B60K 7/0007; B60K 2007/0061; F16C 19/16; F16C 2380/26; F16D 55/226; F16D 65/0081; F16D 65/092; F16D 65/186; F16D 65/853; F16D 2127/02; F16D 2200/0021; F16D 2121/04

See application file for complete search history.

(56) References Cited

U.S. PATENT DOCUMENTS 5,156,579 A * 10/1992 Wakuta ................... H02K 7/116
475/161
9,252,641 B2 * 2/2016 Ishizuka ................ H02K 7/116
(Continued)

FOREIGN PATENT DOCUMENTS

CN 101427045 A 5/2009
CN 103296831 A 9/2013
(Continued)

*Primary Examiner* — Pamela Rodriguez
(74) *Attorney, Agent, or Firm* — Sughrue Mion, PLLC

(57) ABSTRACT

A vehicle-mounted apparatus includes: a motor unit configured to apply a rotational driving force to a wheel of a vehicle and including a drive motor and a speed reducer that reduces a speed of rotation of an output shaft of the drive motor; and a friction brake that reduces rotation of the wheel. The friction brake includes: at least one rotation disc provided so as to be rotatable integrally with the output shaft; a housing that is a non-rotatable member; at least one friction plate held by the housing so as to be movable relative to the housing in the axial direction such that rotation of the at least one friction plate relative to the housing about the axis is restricted; and a pressing device that presses the at least one friction plate against the at least one rotation disc.

11 Claims, 10 Drawing Sheets

(51) Int. Cl.

| | | |
|---|---|---|
| *F16C 19/16* | (2006.01) | |
| *F16D 55/226* | (2006.01) | |
| *F16D 65/00* | (2006.01) | |
| *F16D 65/092* | (2006.01) | |
| *F16D 65/18* | (2006.01) | |
| *F16D 65/853* | (2006.01) | |
| *F16D 55/00* | (2006.01) | |
| *F16D 121/04* | (2012.01) | |
| *F16D 127/02* | (2012.01) | |

(52) U.S. Cl.
CPC .. *F16C 2380/26* (2013.01); *F16D 2055/0033* (2013.01); *F16D 2121/04* (2013.01); *F16D 2127/02* (2013.01); *F16D 2200/0021* (2013.01)

(56) References Cited

U.S. PATENT DOCUMENTS

| | | | |
|---|---|---|---|
| 2009/0000840 A1* | 1/2009 | Murata | B60K 7/0007 180/65.51 |
| 2009/0277727 A1 | 11/2009 | Ueno | |
| 2010/0051395 A1 | 3/2010 | Sano et al. | |
| 2011/0316322 A1 | 12/2011 | Abiko et al. | |
| 2012/0222906 A1 | 9/2012 | Yamamoto | |
| 2013/0221777 A1 | 8/2013 | Ishizuka | |
| 2015/0091366 A1 | 4/2015 | Yamamoto et al. | |
| 2016/0076607 A1 | 3/2016 | Yasui et al. | |
| 2018/0065477 A1 | 3/2018 | Thompson | |
| 2020/0156612 A1* | 5/2020 | Ikuma | F16H 1/32 |
| 2020/0158210 A1* | 5/2020 | Nishigaya | F16H 1/34 |

FOREIGN PATENT DOCUMENTS

| | | |
|---|---|---|
| CN | 104512237 A | 4/2015 |
| CN | 106335356 A | 1/2017 |
| CN | 107428238 A | 12/2017 |
| EP | 2632031 A2 | 8/2013 |
| JP | 8-277861 A | 10/1996 |
| JP | 2001-509236 A | 7/2001 |
| JP | 2010-54010 A | 3/2010 |
| JP | 2010-230128 A | 10/2010 |
| JP | 2012-182917 A | 9/2012 |
| JP | 2012-214103 A | 11/2012 |
| JP | 2013-170697 A | 9/2013 |
| JP | 2014-211222 A | 11/2014 |
| JP | 2015-070674 A | 4/2015 |
| KR | 10-2017-0128506 A | 11/2017 |
| WO | 98/29671 A1 | 7/1998 |
| WO | 2007022865 A1 | 3/2007 |

* cited by examiner

INNER SIDE — OUTER SIDE

US 11,292,438 B2

FRICTION BRAKE AND VEHICLE-MOUNTED APPARATUS

CROSS REFERENCE TO RELATED APPLICATION

The present application claims priority from Japanese Patent Application No. 2018-157198, which was filed on Aug. 24, 2018, the disclosure of which is herein incorporated by reference in its entirety.

BACKGROUND

The following disclosure relates to a friction brake configured to reduce rotation of a wheel driven by a motor unit and to a vehicle-mounted apparatus including the friction brake.

Patent Document 1 (Japanese Patent Application Publication No. 2012-214103) discloses a friction brake provided on a wheel that is driven by a motor unit. The motor unit includes an electric motor and a speed reducer. An output shaft of the speed reducer is coupled to the wheel. The friction brake includes: a plurality of rotation discs provided on the output shaft of the speed reducer so as to be rotatable with the output shaft and movable relative to the output shaft in a direction parallel with the rotation axis; a plurality of friction plates held by a non-rotatable member so as not to be rotatable relative to the non-rotatable member and so as to be movable relative to the non-rotatable member in the direction parallel with the rotation axis; and a pressing device configured to press the plurality of friction plates against the plurality of rotation discs.

The pressing device includes: a pressing member movable in the direction parallel with the rotation axis; and a drive source configured to apply a moving force to the pressing member. The drive source includes: a lever pivotable about a pivot-center axis extending in a direction orthogonal to an axis parallel with the rotation axis; and an actuator that causes pivotal movement of the lever about the pivot-center axis between a non-acting position at which the lever is spaced apart from the pressing member and an acting position at which the lever is in contact with the pressing member. The actuator causes pivotal movement of the lever from the non-acting position to the acting position to move the pressing member in the direction parallel with the rotation axis, so that the friction plate is pressed against the rotation disc. This actuates the friction brake to reduce rotation of the wheel.

SUMMARY

Accordingly, an aspect of the disclosure relates to a technique of reducing the size of a friction brake.

In one aspect of the disclosure, a friction brake is configured to reduce rotation of a wheel that is driven by a motor unit including a speed reducer and an electric motor. The friction brake is configured to reduce rotation of the wheel by reducing rotation of a rotation disc rotatable with an output shaft of the electric motor. The friction brake applies brake torque to the output shaft of the electric motor, and the brake torque is increased by the speed reducer and applied to the wheel. This requires a small pressing force to reduce rotation of the wheel when compared with a friction brake configured to reduce rotation of an output shaft of a speed reducer, resulting in a reduced size of the friction brake.

The motor unit may be a motor unit configured to drive the wheel directly, i.e., a motor unit in which the output shaft of the speed reducer is coupled to the wheel, and may be a motor unit configured to drive the wheel by driving an axle, i.e., a motor unit in which the output shaft of the speed reducer is coupled to the axle. In the case where the motor unit is configured to drive the axle, the motor unit drives the left and right wheels coupled to each other by the axle. By reducing rotation of the output shaft of the electric motor, the present friction brake reduces rotation of the axle, thereby reducing rotation of the left and right wheels. It is noted that the drive motor may be of any of an inner-rotor type and an outer-rotor type.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described vehicle-mounted apparatuses each including a friction brake, according to embodiments by reference to the drawings.

First Embodiment

Figure 1:
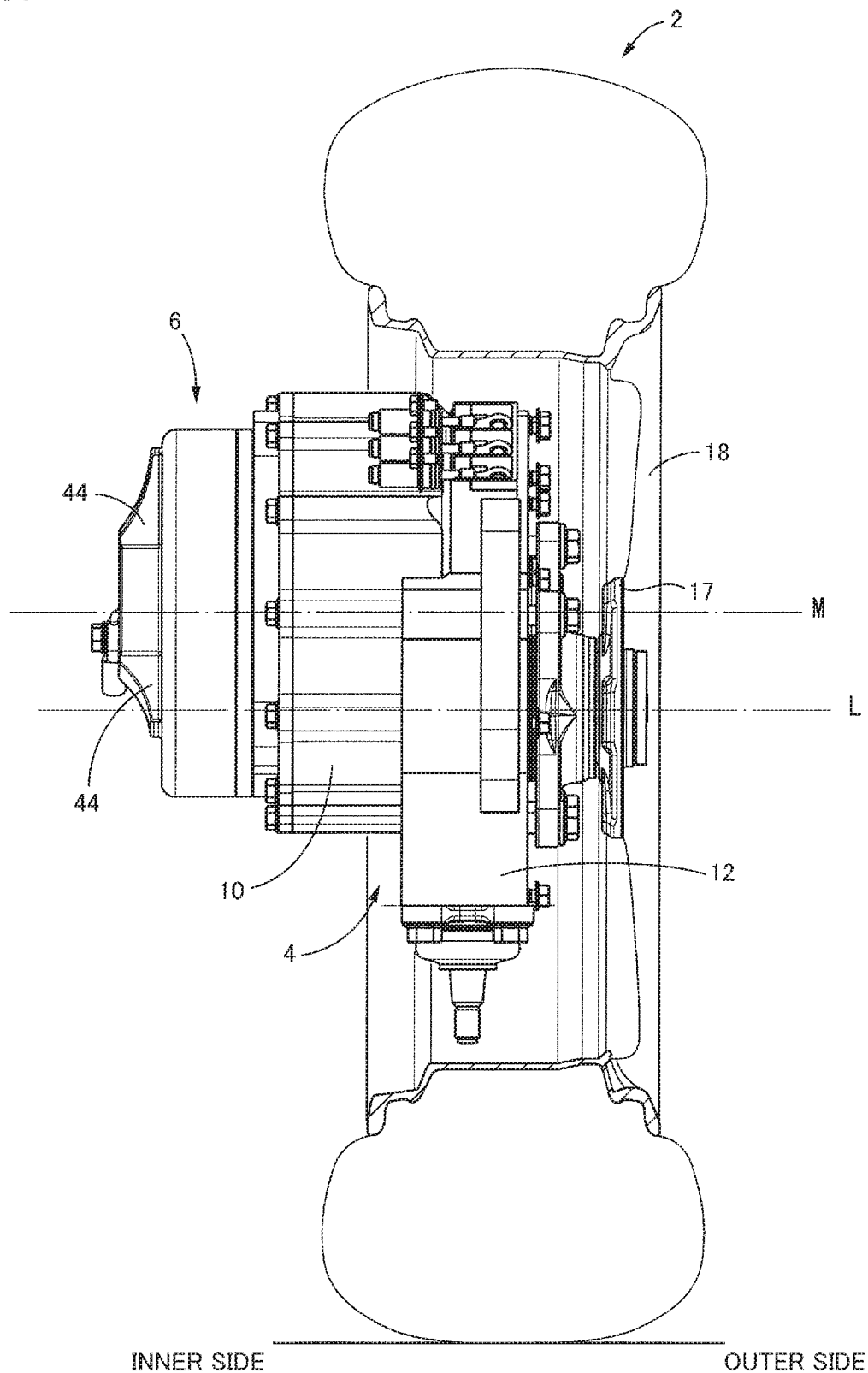
FIG. 1 is a front elevational view of a wheel provided with a friction brake in a first embodiment.
Figure 2:
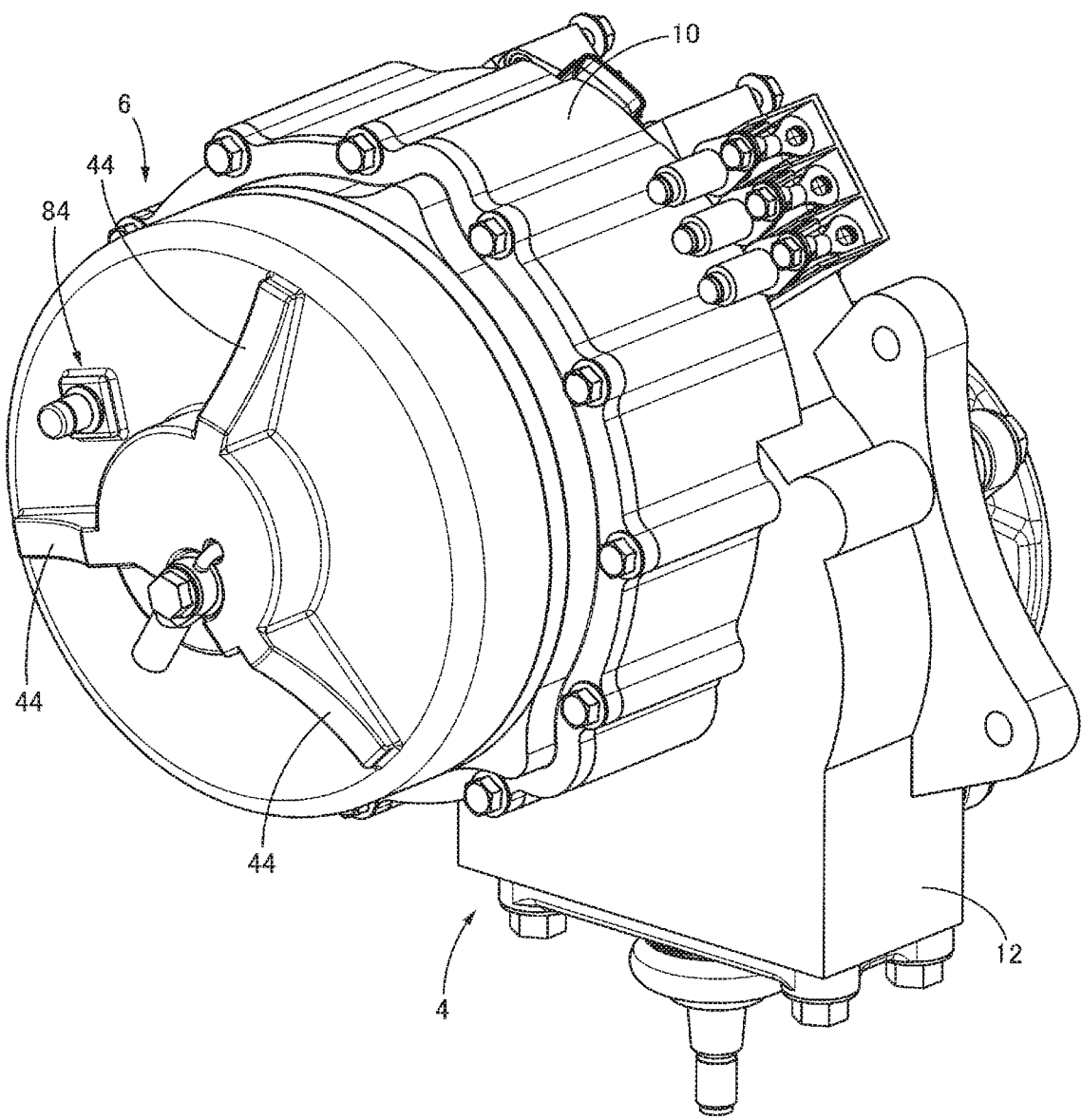
FIG. 2 is a perspective view of a vehicle-mounted apparatus including the friction brake and a motor unit.
Figure 3:
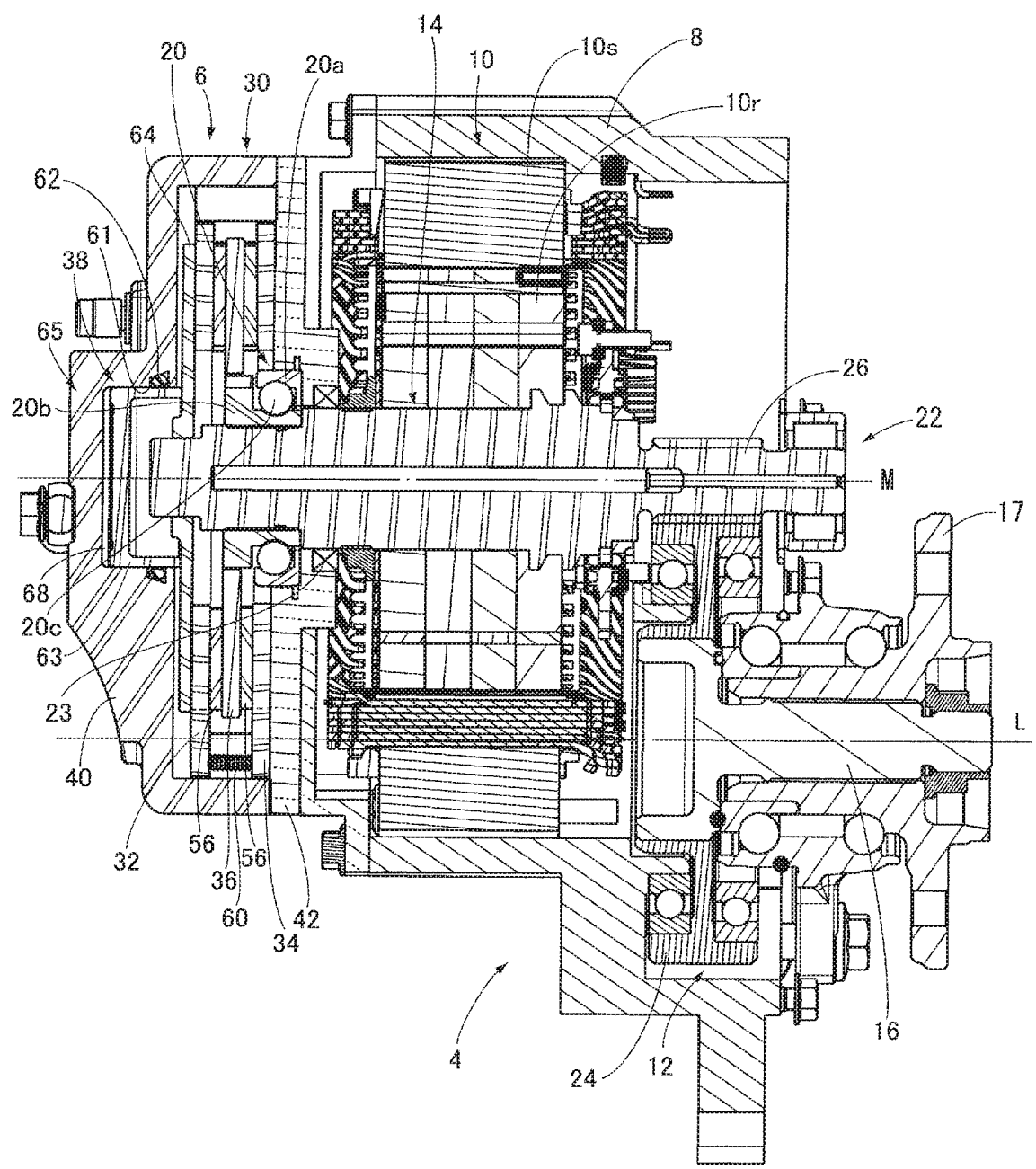
FIG. 3 is a cross-sectional view of the friction brake and the motor unit.

A vehicle-mounted apparatus including a friction brake according to the present embodiment is provided on a wheel of a vehicle. As illustrated in FIGS. 1-3, the vehicle-mounted apparatus includes: a motor unit 4 configured to apply rotation driving torque to a wheel 2; and a friction brake 6 configured to apply brake torque to the wheel 2. The motor unit 4 includes: a unit housing 8 mounted on a suspension member as a non-rotatable member, not illustrated; and a drive motor 10 and a speed reducer 12 held by the unit housing 8. An output shaft 14 of the drive motor 10 is input to the speed reducer 12 that reduces the rotational speed of the input output shaft 14 (the input shaft) and outputs the reduced rotational speed. An output shaft 16 of the speed reducer 12 is fixed to a disc portion 18 of the wheel 2 by a hub 17. Thus, in the present embodiment, the axis of the output shaft 16 of the speed reducer 12 corresponds to the rotation axis L of the wheel 2.

As illustrated in FIG. 3, the drive motor 10 is of an inner-rotor type and includes: a stator 10s held by the unit housing 8 and including a plurality of coils; and a rotor 10r located on an inner circumferential side of the stator 10s and including a plurality of magnets. The output shaft 14 is integrally rotatably mounted on the rotor 10r and is rotated by rotation of the rotor 10r. The output shaft 14 extends in the direction of the axis M parallel with the axial direction L and is rotatably held by the unit housing 8, with bearings 20, 22 interposed between the output shaft 14 and the unit housing 8. As will be described below, a portion of the unit housing 8 is common to a brake housing 30 of the friction brake 6. In the bearing 20, an outer race 20a is fixed to the unit housing 8, an inner race 20b is fixed to the output shaft 14, and a plurality of rotatable members 20c are held between the outer race 20a and the inner race 20b. It is noted that an oil seal 23 is provided between the unit housing 8 and the output shaft 14 of the drive motor 10. In the following description, the direction parallel with the axis M, in other words, the direction parallel with the rotation axis L may be referred to simply as "axial direction".

One end portion of the output shaft 14 of the drive motor 10 in the axial direction serves as an input shaft of the speed reducer 12 (which will be hereinafter referred to as "input shaft 26"). The friction brake 6 is provided on the other end portion of the output shaft 14. A plurality of teeth are formed on an outer circumferential portion of the input shaft 26. Thus, the input shaft 26 may be referred to as "small-diameter gear 26".

The speed reducer 12 is configured to reduce the speed of rotation of the input shaft 26 at one step. The speed reducer 12 is configured to: reduce the rotational speed of the input shaft 26 at a speed reduction ratio $\gamma$ to output the reduced speed to the output shaft 16 and increase rotation torque applied to the input shaft 26, at a ratio $1/\gamma$ to output the increased rotation torque to the output shaft 16. The speed reducer 12 includes a large-diameter gear 24 having a substantially cylindrical shape. The teeth formed on the outer circumferential portion of the input shaft 26 are engaged with teeth formed on teeth formed on an outer circumferential portion of the large-diameter gear 24. The output shaft 16 is pressed in an inner circumferential portion of the large-diameter gear 24 so as to be rotatable together with the large-diameter gear 24. In the present embodiment, the output shaft 16 is held by the large-diameter gear 24 so as to be rotatable with the large-diameter gear 24 at the same speed.

In the present embodiment, the number $n_O$ of the teeth formed on the outer circumferential portion of the large-diameter gear 24 is greater than the number $n_1$ of the teeth formed on the outer circumferential portion of the small-diameter gear 26. Since the speed reduction ratio $\gamma$ is a ratio $(n_1/n_O)$ of the number $n_1$ of the teeth formed on the outer circumferential portion of the small-diameter gear 26 to the number $n_O$ of the teeth formed on the outer circumferential portion of the large-diameter gear 24 ($\gamma=n_1/n_O$), the speed reduction ratio $\gamma$ is less than one. In the present speed reducer 12, as described above, the rotational speed input via the input shaft 26 is reduced at the speed reduction ratio $\gamma$, and the rotation driving torque input via the input shaft 26 is boosted at the ratio $1/\gamma$, and the reduced rotational speed and the boosted rotation driving torque are output to the output shaft 16 and transmitted to the wheel 2.

The friction brake 6 is configured to reduce the speed of rotation of the output shaft 14 of the drive motor 10. The brake torque applied to the input shaft 26 (the output shaft of the drive motor 10) by the friction brake 6 is increased by the speed reducer 12 and applied to the wheel 2.

Figure 4:
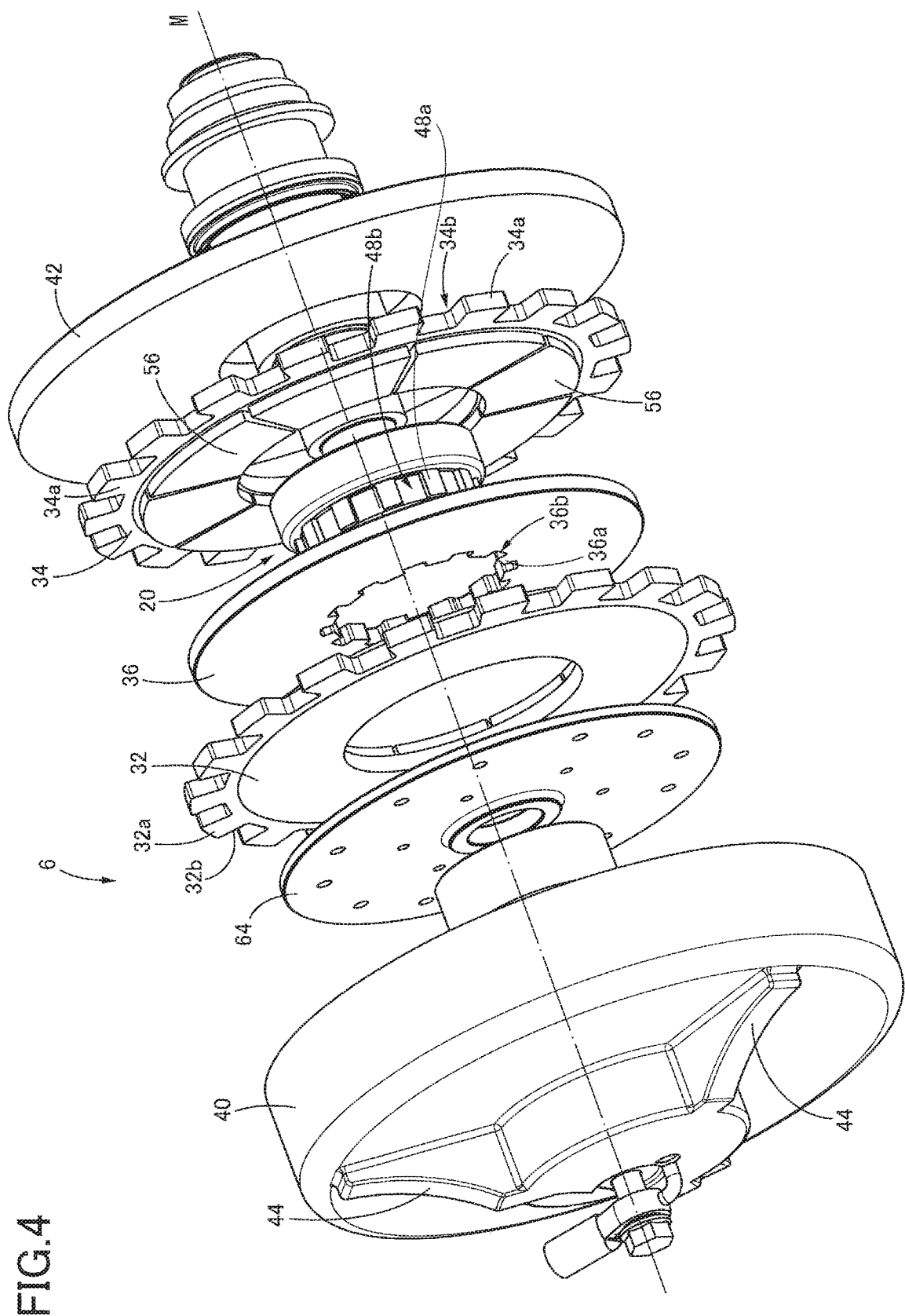
FIG. 4 is an exploded perspective view of the friction brake.
Figure 5:
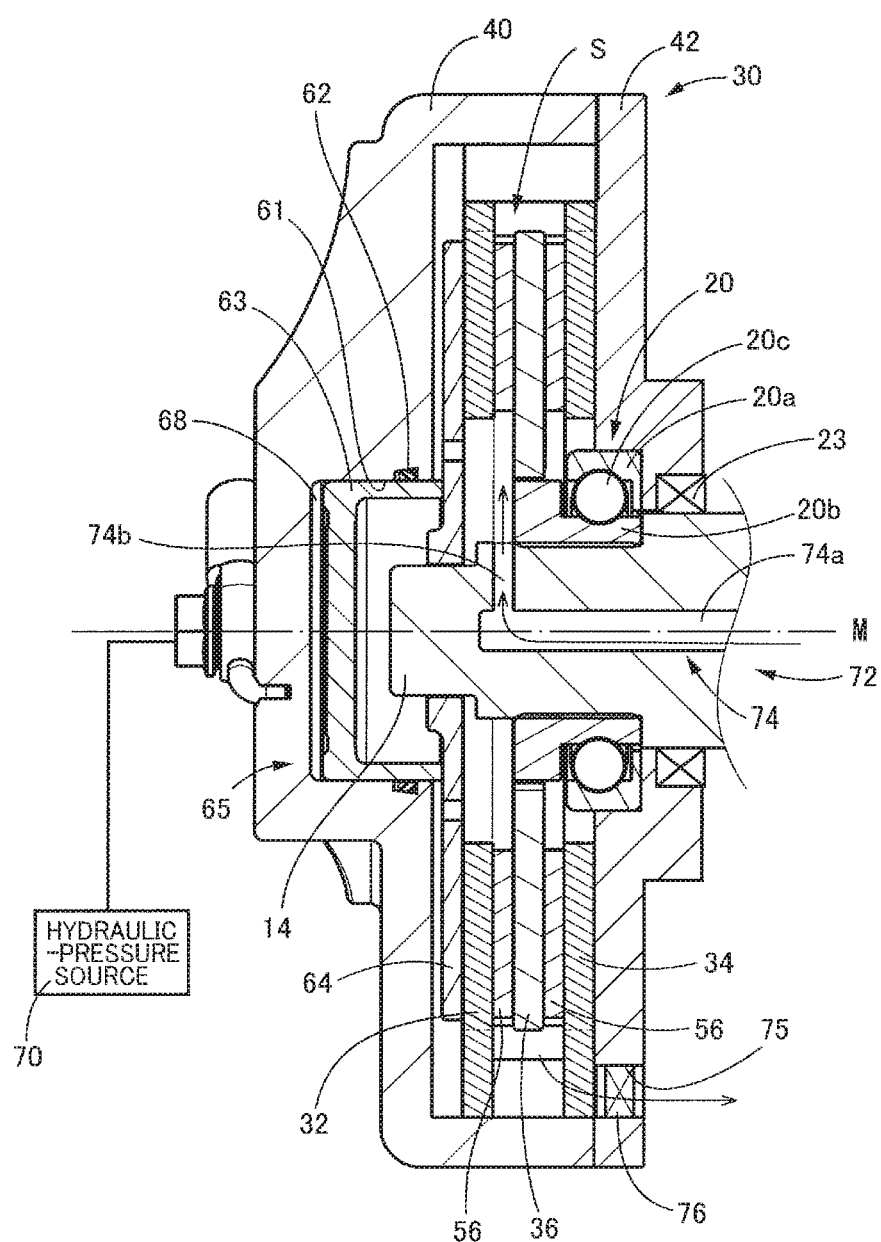
FIG. 5 is a cross-sectional view of the friction brake.

As illustrated in FIGS. 3-5, the friction brake 6 includes: the brake housing 30 that is partly common to the unit housing 8 for the drive motor 10 (noted that it is possible to consider that the brake housing 30 is fixed to the unit housing 8, and the brake housing 30 may be hereinafter referred to simply as "housing 30"); a pair of friction plates 32, 34 held in a state in which the pair of friction plates 32, 34 are movable relative to the housing 30 in the axial direction, and rotation of the pair of friction plates 32, 34 relative to the housing 30 about the axial direction is restricted; a rotor 36 in the form of a rotation disc located between the friction plates 32, 34 so as to be rotatable integrally with the output shaft 14 of the drive motor 10 and movable relative to the output shaft 14 in the axial direction; and a pressing device 38 configured to press the friction plates 32, 34 against the rotor 36.

The housing 30 includes a first housing 40 and a second housing 42 located respectively on opposite sides of the pair of friction plates 32, 34 and the rotor 36. The first housing 40 holds the pressing device 38. The second housing 42 is common to the unit housing 8 for the drive motor 10. The first housing 40 and the second housing 42 are fixed so as to be fluid-tightly coupled to each other. As described above, the oil seal 23 is provided between the second housing 42 and the output shaft 14. As a result, a space S enclosed by the first housing 40 and the second housing 42 is sealed off from the outside, that is, the space S is fluid-tightly isolated from the outside. In other words, the pair of friction plates 32, 34, the rotor 36, and so on are located in the space S sealed off from the outside.

Figure 8:
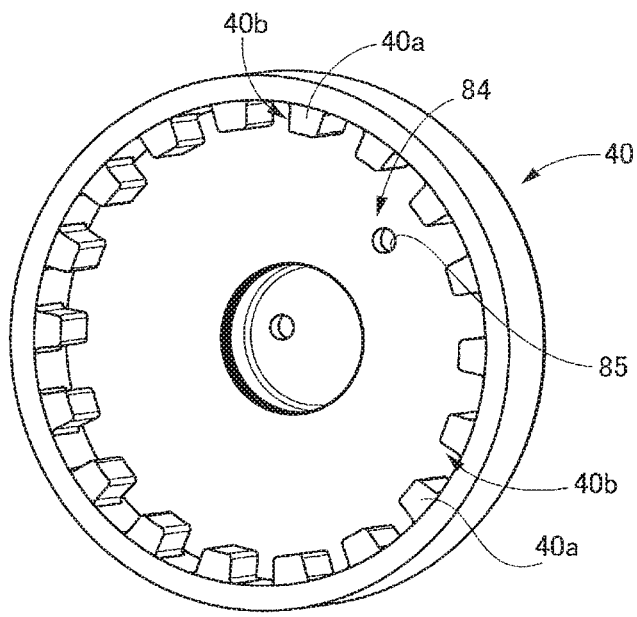
FIG. 8 is a perspective view of a first housing of the friction brake.
Figure 9:
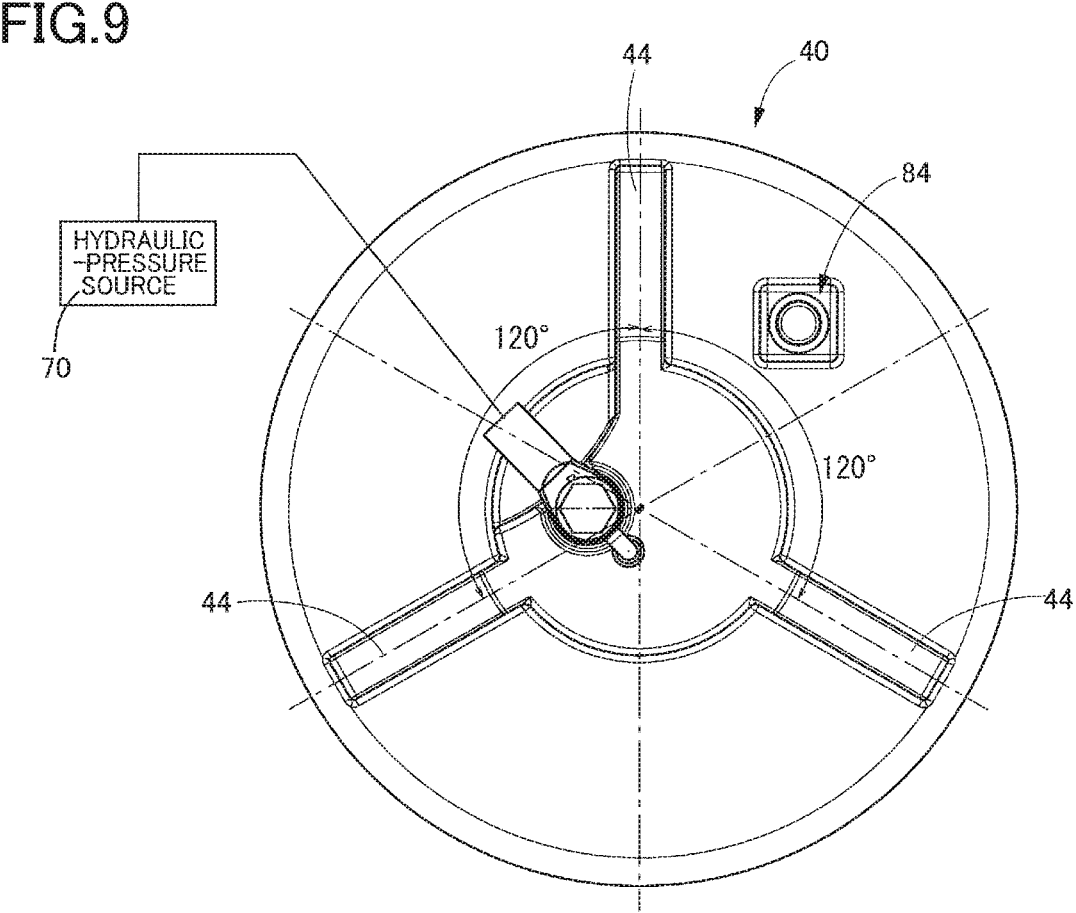
FIG. 9 is a front elevational view of the first housing.

As illustrated in FIGS. 8 and 9, the first housing 40 has a substantially cylindrical shape having a closed bottom, and a plurality of engagement protruding portions 40a are provided on an inner circumferential surface of a cylindrical portion of the first housing 40 so as to be arranged in the circumferential direction of the first housing 40. Each of the engagement protruding portions 40a extends in the axial direction and protrudes inward in the radial direction. Between each adjacent two of the engagement protruding portions 40a, a corresponding one of engagement recessed portions 40b each extending in the axial direction is formed. A plurality of rims 44 are provided on a bottom surface of a bottom portion of the first housing 40. In the present embodiment, three rims 44 each extending radially are spaced apart from each other by a central angle of 120 degrees. These rims 44 reduce deformation of the first housing 40 in the axial direction.

Figure 6:
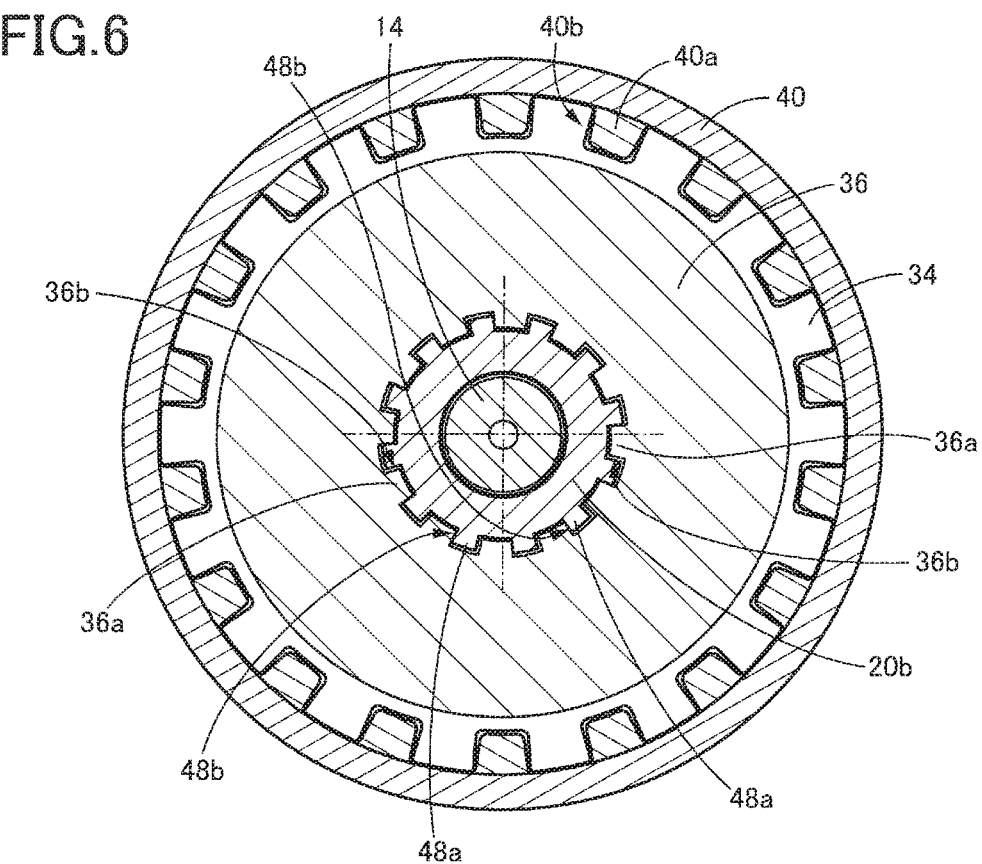
FIG. 6 is a cross-sectional view of a rotor of the friction brake.

The rotor 36 has a substantially annular shape, and an inner circumferential portion of the rotor 36 and an outer circumferential portion of the inner race 20b are fitted to each other at their respective splined portions. As illustrated in FIG. 6, a plurality of teeth are formed on the inner circumferential portion of the rotor 36 so as to be arranged in its circumferential direction. That is, engagement protruding portions 36a and engagement recessed portions 36b are formed on the inner circumferential portion of the rotor 36 so as to be arranged alternately. Each of the engagement protruding portions 36a protrudes inward in the radial direction. Each of the engagement recessed portions 36b is recessed in the radial direction.

As illustrated in, e.g., FIGS. 3 and 4, the bearing 20 extends in the axial direction. The inner race 20b is fixed to the output shaft 14. The outer race 20a is engaged with one end portion of the inner race 20b in the axial direction. Engagement protruding portions 48a and engagement recessed portions 48b are provided on an outer circumferential surface of a portion of the other end portion at which the outer race 20a is not located. The engagement protruding portions 48a and the engagement recessed portions 48b each extending in the axial direction are arranged alternately in the circumferential direction. Each of the engagement protruding portions 48a protrudes outward in the radial direction. Each of the engagement recessed portions 48b is recessed in the radial direction. The engagement protruding portions 36a and the engagement recessed portions 36b provided on the inner circumferential portion of the rotor 36 and the engagement recessed portions 48b and the engagement protruding portions 48a provided on the outer circumferential portion of the inner race 20b are engaged with each other, whereby the rotor 36 is held by the inner race 20b so as to be rotatable about the axis integrally with the inner race 20b and movable relative to the inner race 20b in the axial direction.

Figure 7:
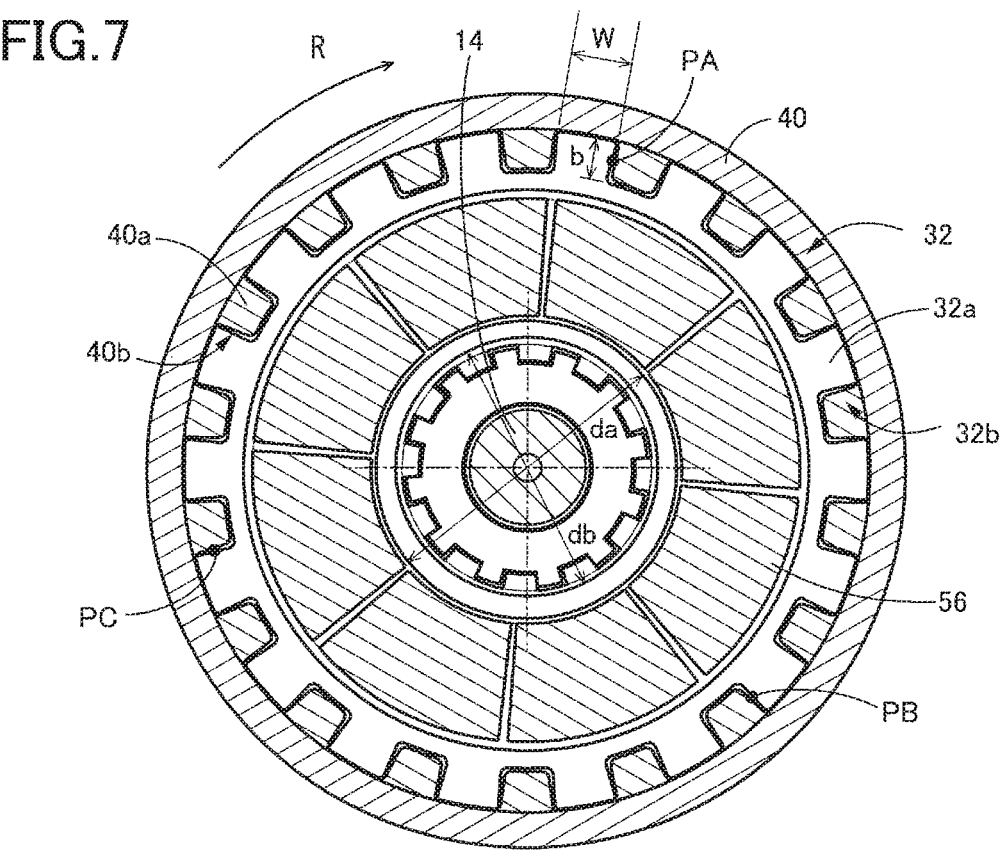
FIG. 7 is a cross-sectional view of a friction plate of the friction brake.

Each of the friction plates 32, 34 has a substantially annular shape. An inner circumferential portion of the cylindrical portion of the first housing 40 and an outer circumferential portion of each of the friction plates 32, 34 are fitted to each other at their respective splined portions. That is, as illustrated in FIGS. 4, 7, and 8, a plurality of teeth are formed on outer circumferential surfaces of the respective friction plates 32, 34. Engagement protruding portions 32a and engagement recessed portions 32b are formed on the outer circumferential surface of the friction plate 32. Engagement protruding portions 34a and engagement recessed portions 34b are formed on the outer circumferential surface of the friction plate 34. The engagement protruding portions 32a and the engagement recessed portions 32b are arranged alternately in the circumferential direction. The engagement protruding portions 34a and the engagement recessed portions 34b are arranged alternately in the circumferential direction. The engagement protruding portions 32a, 34a protrude outward in the radial direction. Each of the engagement recessed portions 40b of the first housing 40 and a corresponding one of the engagement protruding portions 32a, 34a of the friction plates 32, 34 are engaged with each other, and each of the engagement protruding portions 40a of the first housing 40 and a corresponding one of the engagement recessed portions 32b, 34b of the friction plates 32, 34 are engaged with each other, whereby the friction plates 32, 34 are held by the first housing 40 in a state in which the friction plates 32, 34 are movable relative to the first housing 40 in the axial direction, and rotation of the friction plates 32, 34 relative to the first housing 40 about the axis is restricted.

As illustrated in FIG. 7, the inside diameter da of the friction plates 32, 34 is greater than the outside diameter db of the bearing 20. Thus, the bearing 20 does not interfere with movement of the friction plates 32, 34 in the axial direction.

A side surface of each of ones of the engagement protruding portions 32a, 34a of the friction plates 32, 34 in the circumferential direction mainly comes into contact with a side surface of a corresponding one of the engagement recessed portions 40b of the first housing 40 in the circumferential direction during operation of the friction brake 6, which restricts rotation of the friction plates 32, 34. In this case, each of the ones of the engagement protruding portions 32a, 34a receives a force related to a frictional force generated between the rotor 36 and a corresponding one of the friction plates 32, 34. The flexural rigidity of the engagement protruding portions 32a, 34a with respect to the force in the circumferential direction is greater in the case where the geometrical moment of inertia for the engagement protruding portions 32a, 34a is large than in the case where the geometrical moment is small. As illustrated in FIG. 7, the geometrical moment of inertia I for the engagement protruding portions 32a, 34a is represented by the expression "$I=bw^2/6$" where W represents the width (the length in the circumferential direction), and b represents the height (the length in the radial direction). The expression indicates that increase in the width W of each of the engagement protruding portions 32a, 34a increases the flexural rigidity with respect to the force in the circumferential direction.

All the engagement protruding portions 32a, 34a of the friction plates 32, 34 and all the engagement recessed portions 40b of the first housing 40 are not always brought into contact with each other in the circumferential direction during operation of the friction brake 6. In the present embodiment, in contrast, it is assumed that in the case where the friction brake 6 is actuated during rotation of the friction plates 32, 34 in the direction indicated by the arrow R, for example, each of the friction plates 32, 34 and the engagement recessed portions 40b contact each other at three points (e.g., the points PA, PB, PC in FIG. 7), that is, each of three of the engagement protruding portions 32a and three of the engagement protruding portions 34a contacts a corresponding one of the engagement recessed portions 40b. The shapes (e.g., the widths) of the engagement protruding portions 32a, 34a are designed so as to make it difficult for the engagement protruding portions 32a, 34a to be deformed even if a circumferential force related to the maximum frictional force generated between the rotor 36 and each of the friction plates 32, 34 is received at the three points PA, PB, PC.

Each of the friction plates 32, 34 includes eight linings 56 as one example of a plurality of friction engagement members provided on a surface of the friction plate which faces the rotor 36. As illustrated in FIG. 7, each of the linings 56 has a substantially fan shape having a central angle of about 45 degrees (e.g., 43 degrees) and an outside diameter less than the outside diameter of the friction plates 32, 34. In each of the friction plates 32, 34, the linings 56 are stuck on the substantially entire friction plate in the circumferential direction so as to be spaced uniformly around the output shaft 14. That is, the eight linings 56 are stuck on the friction plate so as to occupy a central angle greater than or equal to 300 degrees.

While the shape and the size of each of the linings 56 are designed with consideration of the formability of the linings 56 in the present embodiment, the shape and the size of each of the linings 56 and the number of the linings 56 are not limited to those in the present embodiment. The central angle occupied by the linings 56 is not limited to that in the present embodiment. For example, the linings 56 may be provided so as to occupy a central angle greater than or equal to 180 degrees, 210 degrees, or 240 degrees. Alternatively, the linings 56 may be provided so as to occupy the central angle of 360 degrees. In other words, the linings 56 may have an annular shape.

Figure 10:
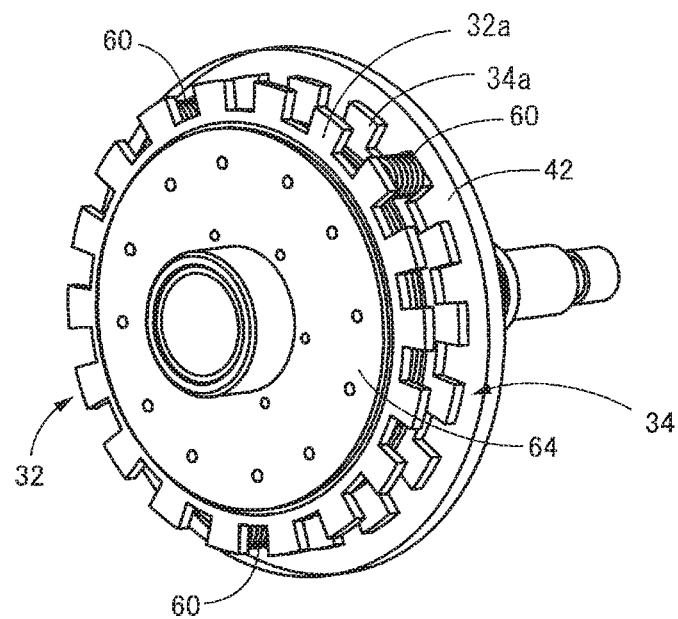
FIG. 10 is a perspective view of a main portion of the friction brake.

As illustrated in FIG. 10, three return springs 60 are provided between the friction plates 32, 34. For example, each of the return springs 60 is provided between a corresponding one of the engagement protruding portions 32a and a corresponding one of the engagement protruding portions 34a. In the present embodiment, the return springs 60 are spaced apart from each other by a central angle of substantially 120 degrees. In the case where the friction brake 6 is released, the return springs 60 separate the friction plates 32, 34 from the rotor 36 well, making it possible to reduce brake drag well.

It is noted that the number of the return springs 60 is not limited to three, but three or more return springs 60 are preferably provided and spaced uniformly to separate the friction plates 32, 34 from the rotor 36 well.

The pressing device 38 is configured to press the friction plates 32, 34 against the rotor 36. As illustrated in FIGS. 3 and 5, the pressing device 38 includes: a piston 63 as one example of a pressing member slidably fitted via a piston seal 62 to a cylinder bore 61 that is formed in the first housing 40 so as to extend in the axial direction; a pressing plate 64 disposed between the piston 63 and a friction plate 32 so as to be movable in the axial direction; and a drive source 65 configured to apply a pressing force to the piston 63. This pressing force is a force in the axial direction. The cylinder bore 61 has a hydraulic-pressure chamber 68 to which a hydraulic-pressure source 70 is connected. The hydraulic-pressure source 70 includes a pump and an accumulator. In the present embodiment, a portion of the first housing 40 which has the cylinder bore 61 corresponds to a cylinder body, i.e., a housing of the pressing device 38. Components including the cylinder body and the hydraulic-pressure chamber 68 constitute the drive source 65 configured to apply, to the piston 63, a force in the axial direction which is generated by a hydraulic pressure.

The pressing plate 64 is formed of steel having high stiffness, for example. The pressing plate 64 has a substantially annular shape. The outside diameter of the pressing plate 64 may be, for example, greater than the diameter of the piston 63 and less than equal to the diameter defined by outer circumferential surfaces of the respective linings 56 of the friction plates 32, 34.

Thus, since the pressing plate 64 is disposed between the friction plate 32 and the piston 63, it is possible to bring the linings 56 into contact with the rotor 36 well. For example, it is possible to bring the linings 56 into contact with the rotor 36 substantially uniformly. It is known that a frictional force generated between the rotor 36 and the linings 56 during operation of the friction brake 6 is of a magnitude obtained by multiplying the pressing force by a coefficient of friction as a principle, and since a linear domain of the coefficient of friction is larger in the case where the area of contact between the linings 56 and the rotor 36 is large than in the case where the area of contact between the linings 56 and the rotor 36 is small, the coefficient of friction is large at a region in which the pressing force is large. Likewise, it is known that the coefficient of friction is larger at the region in which the pressing force is large in a state in which the rotor 36 and the linings 56 are held in contact with each other substantially uniformly than in a state in which the rotor 36 and the linings 56 are held in contact with each other nonuniformly. In view of the above, it is considered that the frictional force generated between the rotor 36 and the linings 56 of the pair of friction plates 32, 34 is larger in the case where the hydraulic pressure in the hydraulic-pressure chamber is the same than in the case of a disc brake including a conventional caliper.

The inside of the sealed space S formed between the first housing 40 and the second housing 42 is heated by sliding movement between the rotor 36 and each of the friction plates 32, 34, for example, resulting in increase in the temperature of the sealed space S. To solve this problem, in the present embodiment, as illustrated in FIG. 5, a brake cooling mechanism 72 is provided for cooling the inside of the space S. The brake cooling mechanism 72 uses cooling liquid of a cooling mechanism, not illustrated, for cooling the drive motor 10 (hereinafter referred to as "motor cooling mechanism"). The cooling liquid is circulated between the motor cooling mechanism and the brake cooling mechanism 72.

The brake cooling mechanism 72 includes: a cooling-liquid supply passage 74 defined in the output shaft 14; and a filter 76. The cooling-liquid supply passage 74 includes: a main passage 74a formed in the output shaft 14 so as to extend in the axial direction; and one or more jet passages 74b communicating with the main passage 74a, extending in the radial direction, and opening in an outer circumferential surface of the output shaft 14. The jet passages 74b are formed and opened at a portion of the output shaft 14 which is substantially opposed to the linings 56. With rotation of the output shaft 14, the cooling liquid is transferred via the main passage 74a and the jet passages 74b and emitted substantially radially to cool friction engagement surfaces of the rotor 36 and the friction plates 32, 34, for example.

In the present brake cooling mechanism 72, the cooling liquid is supplied from an inner circumferential portion of the friction brake 6 and discharged from an outer circumferential portion of the friction brake 6. As illustrated in FIG. 5, the filter 76 is provided in a discharge passage 75 defined in the housing 30 for discharging the cooling liquid. The cooling liquid supplied into the space S is discharged to the outside of the space S via (i) a space between (a) each of the engagement protruding portions 32a, 34a and the engagement recessed portions 32b, 34b of the friction plates 32, 34 and (b) a corresponding one of the engagement protruding portions 40a and the engagement recessed portions 40b of the first housing 40, and (ii) the discharge passage 75. The discharged cooling liquid, for example, contains wearing powder generated from the linings 56, the rotor 36, and so on. The filter 76 removes the wearing powder. This makes it difficult to supply (circulate) the cooling liquid containing the wearing powder, to the motor cooling mechanism.

Thus, the present friction brake 6 need not be of a dry type and may be of a wet type in which the space located between the rotor 36 and each of the friction plates 32, 34 is filled with working liquid (that is the same as the cooling liquid, for example).

Figure 11:
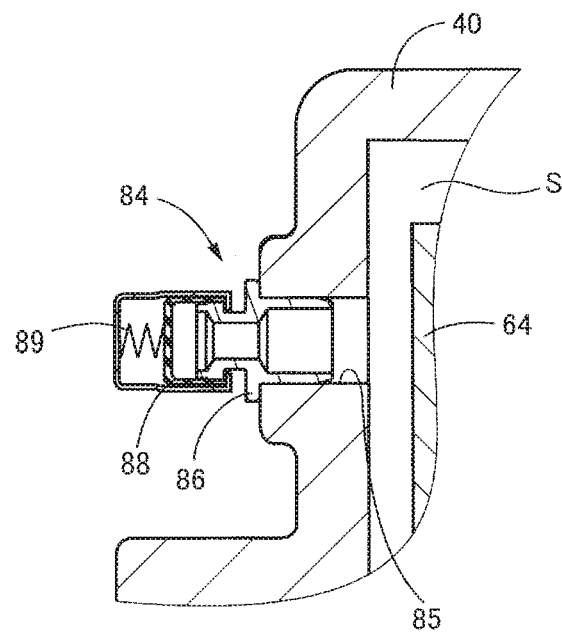
FIG. 11 is a cross-sectional view of a breather plug provided on the first housing.

In the present embodiment, as illustrated in FIGS. 8, 9, and 11, a breather plug 84 is provided at a portion of a bottom surface of the first housing 40 which is spaced apart from the pressing device 38. The volume of the breather plug 84 is variable. The breather plug 84 includes: a main body 86 fitted to a through hole 85 extending through the bottom portion of the first housing 40 in substantially the axial direction; a cap portion 88 formed of rubber and held so as to be movable relative to the main body 86 in the axial direction; and a spring 89 configured to urge the cap portion 88 toward the main body 86. In normal situations, the spring 89 keeps the cap portion 88 close to the main body 86 in the breather plug 84. When the pressure in the space S has risen, the cap portion 88 is moved away from the main body 86 against the spring force of the spring 89, which increases the volume in the breather plug 84 and the volume in the space S. This prevents the pressure in the space S from becoming excessively high with respect to a pressure outside the space S, thereby preventing leakage of the working liquid from the inside of the space S, for example.

In the vehicle-mounted apparatus configured as described above, when a hydraulic pressure is supplied from the hydraulic-pressure source 70 to the hydraulic-pressure chamber 68, a force in the axial direction is applied to the piston 63. This moves the piston 63 and the pressing plate 64 in the axial direction. The friction plate 32, the rotor 36, and the friction plate 34 are moved in the axial direction and brought into contact with the second housing 42. The rotor 36 is sandwiched between the friction plates 32, 34, whereby the rotor 36 and the linings 56 of the friction plates 32, 34 are brought into frictional engagement with each other. That is, the friction brake 6 is operated to apply brake torque to the output shaft 14 of the drive motor 10.

The brake torque applied to the output shaft 14 by the friction brake 6 is boosted by the speed reducer 12 and applied to the wheel 2. Thus, in the vehicle-mounted apparatus according to the present embodiment, in the case where the brake torque applied to the wheel 2 is the same, it is possible to reduce the pressing force applied to the piston 63 in the friction brake 6, when compared with the case where the friction brake is provided on the output shaft of the speed reducer as described in Patent Document 1. This can reduce an amount of wearing of the linings 56 during one operation of the friction brake 6, making it possible to reduce the thickness of the linings 56 in the case where the useful life of the linings 56 is the same.

As described above, the linings 56 are provided over the circumferentially entire portions of the friction plates 32, 34 which face the rotor 36, and the friction plate 32 is pressed against the rotor 36 with the pressing plate 64 interposed therebetween. Thus, the rotor 36 and the linings 56 are brought into contact with each other well, making it possible to generate a large brake force. This can reduce the radius of each of the rotor 36 and the friction plates 32, 34.

For weight reduction of the friction brake, the housing is preferably formed of a material such as aluminum alloy. In the case where the housing is formed of a material such as aluminum alloy, however, the housing is easily deformed during operation of the friction brake 6, which may lead to a lower response of the friction brake 6. For example, the first housing 40 is easily stretched in the axial direction by the reaction force applied to the piston 63 during operation of the friction brake 6, leading to increase in a stroke of the piston which is required for the pressing force to reach a set value. In the friction brake 6 according to the present embodiment, in contrast, the rims 44 are provided on the first housing 40, making it possible to reduce the stretch of the first housing 40 in the axial direction. This enables the housing 30 to be formed of a material such as aluminum alloy while reducing the lowering of the response of the friction brake 6.

Figure 12:
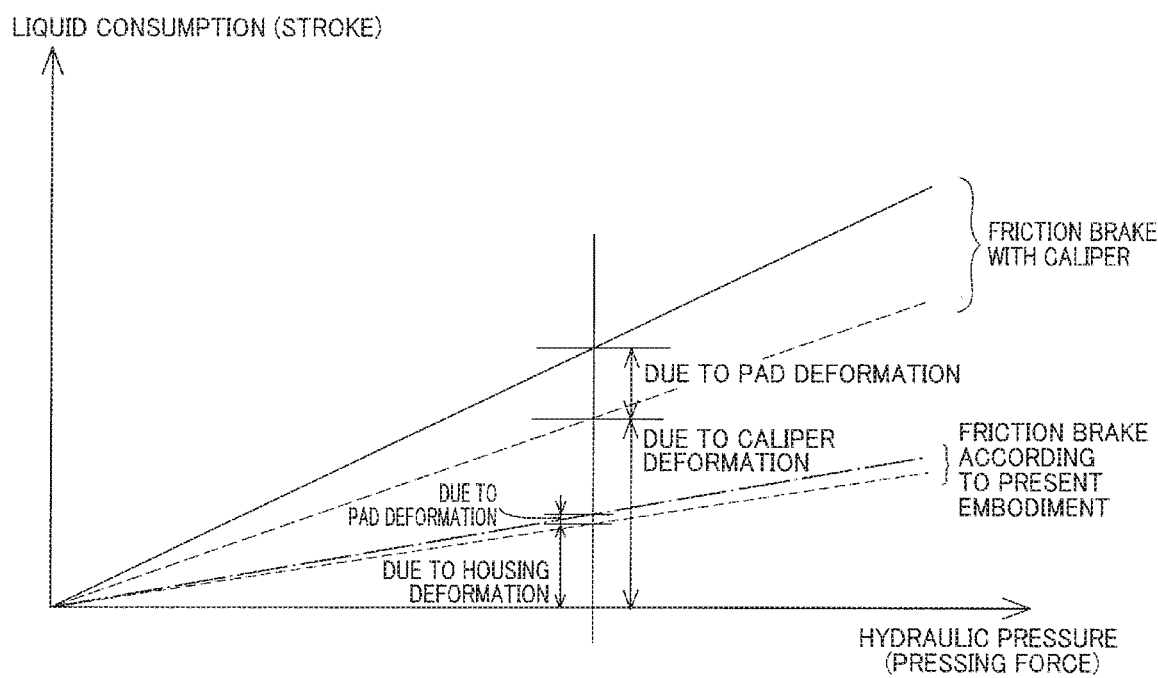
FIG. 12 is a view representing a relationship between a stroke and a hydraulic pressure in the friction brake.

The constructions described above can reduce the size and the weight of the friction brake 6. In the friction brake 6 according to the present embodiment, as illustrated in FIG. 12, the stroke of the piston (an amount of the working liquid to be supplied to the hydraulic-pressure chamber 68) in the case where a hydraulic pressure generated in the hydraulic-pressure chamber 68 is the same is small when compared with friction brakes including a caliper. In other words, in the present friction brake 6, it is possible to reduce a stroke of the piston 63 which is required before the friction brake 6 is operated, resulting in increase in response of the friction brake 6.

The friction brake 6 requires a smaller amount of the liquid supplied from the hydraulic-pressure source 70 before establishment of the operating state of the friction brake 6, resulting in reduced size and weight of the hydraulic-pressure source 70.

The friction plates 32, 34 and the rotor 36 disposed in the space S sealed by the first housing 40 and the second housing 42, thereby preventing the wearing powder and the like generated from the linings 56, the rotor 36, and so on from being emitted to the outside. That is, it is possible to achieve zero emission.

In the present embodiment, the rotor 36 and the bearing 20 are formed of a material having high stiffness such as steel, and the friction plates 32, 34 and the first housing 40 are formed of a light material such as aluminum alloy. In the operating state of the friction brake 6, a smaller force is applied in the circumferential direction to an outer circumferential portion of the friction brake 6 than to an inner circumferential portion of the friction brake 6. Thus, it is appropriate that the rotor 36 formed of a material having high stiffness is held at its inner circumferential surface by the inner race 20b, and the friction plates 32, 34 formed of a material having low stiffness is held at their respective outer circumferential surfaces by the first housing 40. This appropriate design of materials can reduce the weight and cost of the friction brake 6.

In the case where the friction brake 6 is released, the piston 63 is moved back to its rearmost position by the piston seal 62, the pair of friction plates 32, 34 are separated from the rotor 36 by the return springs 60. This operation reduces brake drag well.

In the friction brake described in Patent Document 1, since the drive source includes the lever, a force containing a component in a direction intersecting the axial direction is applied to the pressing member by the lever. In the friction brake according to the present embodiment, in contrast, only a force in the axial direction, i.e., a force not containing a component in the direction intersecting the axial direction is applied to the piston 63 from the drive source 65. This makes it possible to move the piston 63 in the axial direction well and efficiently.

Figure 13:
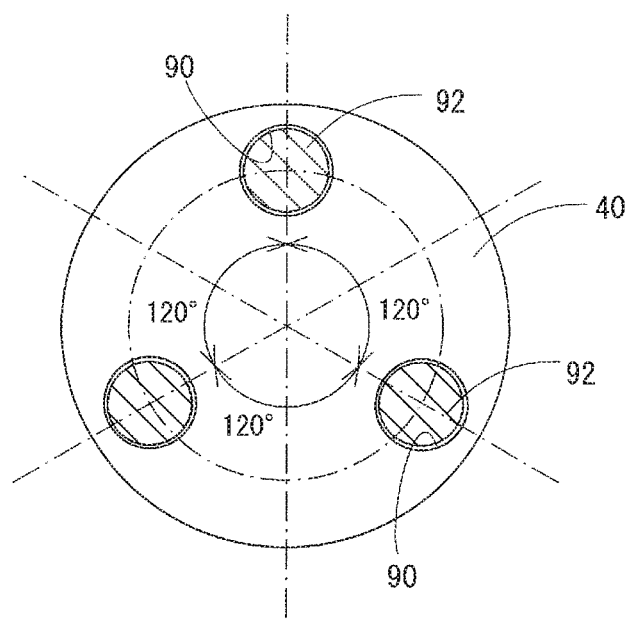
FIG. 13 is a view conceptually illustrating a pressing device different from the friction brake.

The pressing device 38 includes the single piston 63 as the pressing member in the above-described embodiment, but as illustrated in FIG. 13 the pressing device 38 may include a plurality of pressing members spaced apart from each other on the circumference of a circle. In the present embodiment, three cylinder bores 90 each extending in the axial direction are formed in the first housing 40 on the circumference of the circle so as to be spaced apart from each other by a central angle of 120 degrees. Pistons 92 are fluid-tightly and slidably fitted to the respective cylinder bores 90 via piston seals, not illustrated. The pistons 92 are moved in the axial direction by hydraulic pressures in hydraulic-pressure chambers, not illustrated, to apply the force in the axial direction to the friction plate 32 via the pressing plate 64.

Providing the brake cooling mechanism is not essential. For example, in the case where the friction brake 6 is provided at a position at which the friction brake 6 can be cooled by air, it is considered that there is a small necessity for using the cooling liquid to cool the inside of the space S. In this case, the friction brake 6 may be of a dry type.

The friction brake may be of a multiple-disc type. For example, the friction brake may include a plurality of rotors as rotation discs; and friction plates, such that the rotors and the friction plates are arranged alternately. Thus, in the case where the friction brake is of a multiple-disc type, it is possible to apply a larger brake force to the wheel 2. The friction plate 34 is not essential, and the linings 56 may be provided directly on a surface of the second housing 42 which faces the first housing 40.

Figure 14:
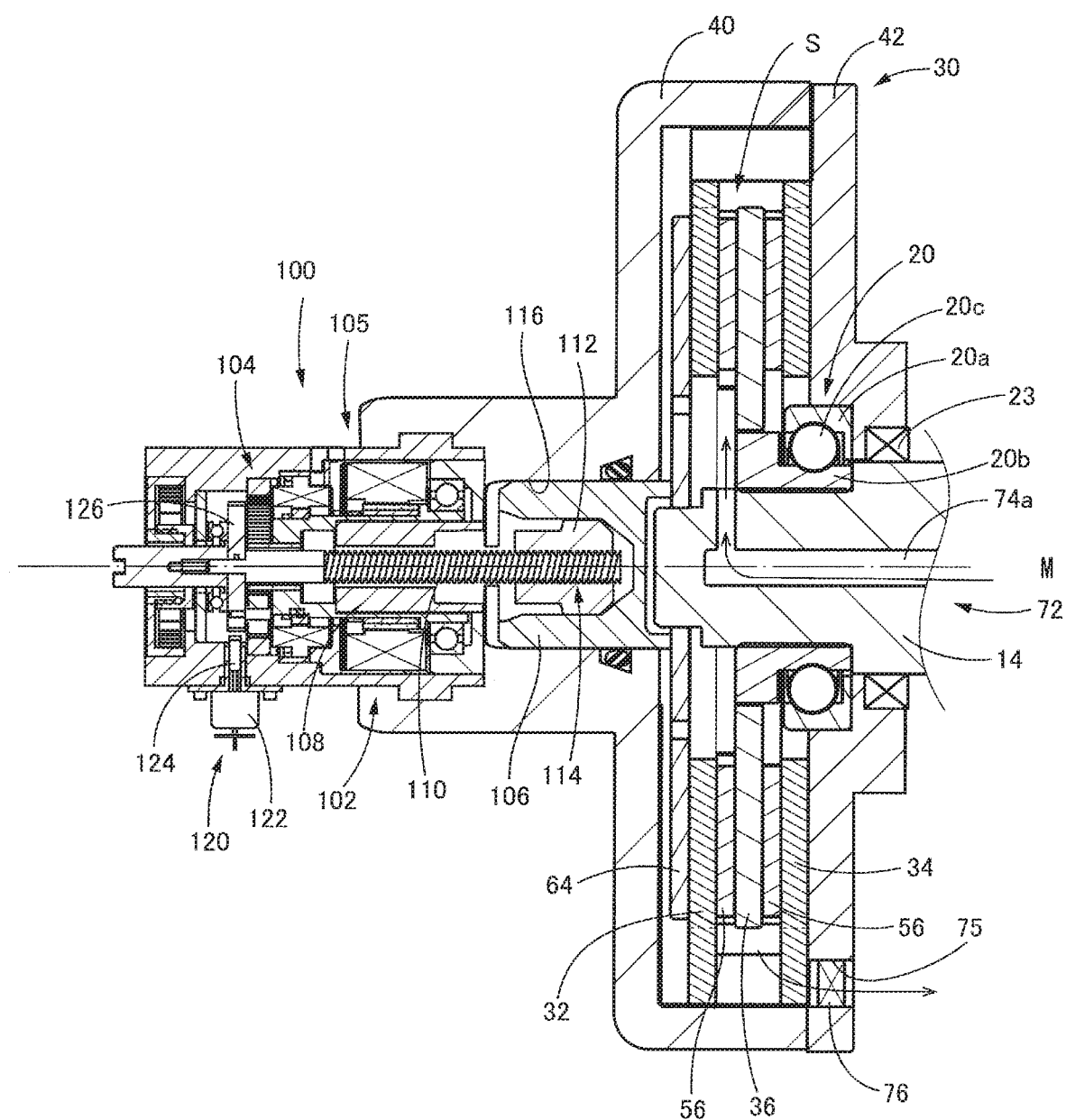
FIG. 14 is a cross-sectional view of a friction brake according to a second embodiment.

The pressing device of the friction brake may be electrically operated. FIG. 14 illustrates one example of this configuration. In the present embodiment, a pressing device 100 includes a drive source 105 and a pressing member 106. The drive source 105 includes an electric motor 102, a speed reducer 104, and a transmission member 112. The speed reducer 104 reduces the speed of rotation of an output shaft 108 of the electric motor 102. The transmission member 112 is engaged with an output shaft 110 of the speed reducer 104, with a thread mechanism 114 interposed therebetween. A bore 116 is formed in the first housing 40 so as to extend in the axial direction. The pressing member 106 is held in the bore 116 so as to be movable relative to the bore 116. The transmission member 112 is fitted to the pressing member 106 so as not to be rotatable relative to the transmission member 112 and so as to be movable forward in the axial direction integrally with the transmission member 112.

In the present pressing device, the output shaft 108 is rotated by driving of the electric motor 102, and the speed of the rotation of the output shaft 108 is reduced by the speed reducer 104 and output to the output shaft 110. Rotation of the output shaft 110 is converted to straight movement of the transmission member 112 via the thread mechanism 114, and a force in the axial direction is applied to the pressing member 106 via the transmission member 112. Movement of the pressing member 106 in the axial direction and movement of the pressing plate 64 in the axial direction cause the friction plates 32, 34 to be pressed against the rotor 36 to actuate the friction brake.

The pressing device 100 includes a parking-brake mechanism 120. The parking-brake mechanism 120 is a mechanism in which the pressing member 106 is moved forward in a state in which no current is supplied to the vehicle-mounted apparatus, to prevent rotation of the electric motor 102 which is caused by an axial force acting on the pressing member 106 (rotation of the electric motor 102 which moves the pressing member 106 backward) in a state in which the rotor 36 and the linings 56 are held in frictional engagement with each other. In the parking-brake mechanism 120, a solenoid 122 is turned on to move a ratchet pawl 124 forward, so that the ratchet pawl 124 is engaged with one of ratchet teeth provided on a flange 126 rotatable with the output shaft 110 of the speed reducer 104. Even in the case where the force in the axial direction is applied to the pressing member 106 in the state in which the ratchet pawl 124 is engaged with one of the ratchet teeth, the parking-brake mechanism 120 prevents rotation of the electric motor 102 due to the force in the axial direction. This engaged state is kept even after the solenoid 122 is demagnetized. Thus, the pressing device 100 according to the present embodiment functions also as an electric parking brake.

While the embodiments have been described above, it is to be understood that the disclosure is not limited to the details of the illustrated embodiments, but may be embodied with various changes and modifications, which may occur to those skilled in the art, without departing from the spirit and scope of the disclosure. For example, the vehicle-mounted apparatus may be provided on an axle.

Claimable Inventions (1) A friction brake configured to reduce rotation of a wheel of a vehicle which is driven by a motor unit comprising a drive motor and a speed reducer configured to reduce a speed of rotation of an output shaft of the drive motor, the friction brake comprising:

at least one rotation disc provided so as to be rotatable integrally with the output shaft of the drive motor and movable relative to the output shaft in an axial direction that is a direction of an axis parallel with a rotation axis of the wheel;

a housing that is a non-rotatable member;

at least one friction plate held by the housing so as to be movable relative to the housing in the axial direction such that rotation of the at least one friction plate relative to the housing about the axis is restricted; and a pressing device configured to press the at least one friction plate against the at least one rotation disc.

The rotation disc may be mounted directly on the output shaft of the drive motor and may be mounted on a component rotatable integrally with the output shaft of the drive motor (e.g., an inner race of a bearing that holds the output shaft such that the output shaft is rotatable relative to the housing). In most cases, the friction plates and the rotation disc are arranged alternately in the axial direction, and the friction plate is located on opposite sides of the rotation disc. However, a friction engagement member immovable relative to the output shaft in the axial direction only needs to be disposed on one of opposite sides of one of the at least one rotation disc, and the friction plate may not be disposed. It is noted that the friction brake may of any of a wet type and a dry type. The housing of the friction brake may be mounted on a suspension member as a non-rotatable member and may be mounted on a non-rotatable member via the motor unit.

(2) The friction brake according to the above form (1), wherein the friction brake is located on an opposite side of the drive motor from the speed reducer in the axial direction.

The friction brake, the drive motor, and the speed reducer are arranged in this order in the axial direction, and the output shaft of the speed reducer is coupled to the wheel or an axle.

(3) The friction brake according to the above form (1) or (2), wherein the at least one rotation disc and the at least one friction plate are located in a space enclosed by the housing.

(4) The friction brake according to any one of the above forms (1) through (3), wherein the housing comprises a first housing having a substantially cylindrical shape having a closed bottom, wherein the first housing comprises a cylindrical portion and a bottom portion, wherein the pressing device is held by the first housing, and wherein at least one rim is provided at the bottom portion of the first housing.

(5) The friction brake according to the above form (4), a plurality of rims as the at least one rim are provided on the bottom portion of the first housing such that each of the plurality of rims extends radially.

(6) The friction brake according to any one of the above forms (1) through (5), wherein the housing comprises a first housing having a substantially cylindrical shape, wherein each of the at least one friction plate has a substantially annular-plate shape, wherein at least one engagement protruding portion is provided at one of an inner circumferential portion of a cylindrical portion of the first housing and an outer circumferential portion of the at least one friction plate, wherein at least one engagement recessed portion is provided at the other of the inner circumferential portion of the cylindrical portion of the first housing and the outer circumferential portion of the at least one friction plate, and wherein engagement between the at least one engagement protruding portion and the at least one engagement recessed portion causes the at least one friction plate to be held at the outer circumferential portion by the inner circumferential portion of the first housing in a state in which the at least one friction plate is movable relative to the first housing in the axial direction, and rotation of the at least one friction plate relative to the first housing about the axis is restricted.

For example, the engagement protruding portion and the engagement recessed portion may be constituted by a key and a key groove. The friction brake may be configured such that a plurality of the engagement protruding portions and a plurality of the engagement recessed portions are provided at each of the outer circumferential portion of the friction plate and the inner circumferential portion of the cylindrical portion of the first housing, and the friction plate and the first housing are fitted to each other at their respective splined portions. This applies to form (8). It is noted that any of the engagement protruding portion and the engagement recessed portion is provided at the inner circumferential portion of the cylindrical portion of the first housing so as to extend in the axial direction.

(7) The friction brake according to the above form (6), wherein a plurality of engagement protruding portions as the at least one engagement protruding portion are provided on an outer circumferential portion of the friction plate, wherein a plurality of engagement recessed portions as the at least one engagement recessed portion are provided on the inner circumferential portion of the cylindrical portion of the first housing, and wherein the shape of the plurality of engagement protruding portions is determined by assuming that three of the plurality of engagement protruding portions contact the engagement recessed portion when the friction brake is operated.

(8) The friction brake according to any one of the above forms (1) through (7), wherein the output shaft of the drive motor is rotatably held by the housing with a bearing interposed between the output shaft and the housing, wherein the bearing comprises:
an inner race rotatable integrally with the output shaft;
an outer race fixed to the housing; and
a plurality of rotatable members provided between the inner race and the outer race, wherein at least one engagement protruding portion is provided at one of an inner circumferential portion of the at least one rotation disc and an outer circumferential portion of the inner race, wherein at least one engagement recessed portion is provided at the other of the inner circumferential portion of the at least one rotation disc and the outer circumferential portion of the inner race, and wherein engagement between the at least one engagement protruding portion and the at least one engagement recessed portion causes the inner race to hold the at least one rotation disc in a state in which the at least one rotation disc is movable relative to the inner race in the axial direction and rotatable integrally with the inner race.

The at least one rotation disc is held by the inner race so as to be movable relative to the inner race in the axial direction and rotatable integrally with the inner race. While the bearing is provided between the housing of the friction brake and the output shaft of the drive motor, it is also possible to consider that a portion of the housing of the friction brake which holds the bearing is a housing of the motor unit (a unit housing). Any of the engagement protruding portion and the engagement recessed portion is provided at the outer circumferential portion of the inner race so as to extend in the axial direction.

(9) The friction brake according to any one of the above forms (1) through (8), wherein each of the at least one friction plate has a substantially annular-plate shape and comprises at least one friction engagement member provided on a facing surface of said each of the at least one friction plate in a state in which the at least one friction engagement member occupies a central angle of 180 degrees on the facing surface, and the facing surface faces one of the at least one rotation disc.

The friction plate may include one friction engagement member or a plurality of friction engagement members. The friction engagement member at least needs to be provided so as to occupy the central angle of 180 degrees, for example, and may be provided so as to occupy the central angle of any of an angle greater than or equal to 210 degrees, an angle greater than or equal to 240 degrees, and an angle greater than or equal to 270 degrees. The friction engagement member may be provided across the substantially entire circumference of the facing surface.

(10) The friction brake according to any one of the above forms (1) through (9), wherein the pressing device comprises:

a pressing member held by the housing so as to be movable in the axial direction; and a drive source configured to apply a force in the axial direction to the pressing member.

The drive source does not apply a force, which contains a component in a direction intersecting the axis, to the pressing member as in the lever recited Patent Document 1 but applies a force, which does not contain the component in the direction intersecting the axis, to the pressing member. The drive source may have a hydraulic-pressure chamber opposed to the pressing member and may include an electric motor having an output shaft extending parallel with the axis, for example.

(11) The friction brake according to the above form (10), wherein the pressing device comprises a pressing plate provided between the pressing member and one of the at least one friction plate which is nearest to the pressing member among the at least one friction plate, and wherein an outside diameter of the pressing plate is greater than an outside diameter of the pressing member and less than an outside diameter of the at least one friction plate.

The pressing plate may have a substantially annular-plate shape. The outside diameter of the pressing plate may be, for example, less than or equal to the outside diameter defined by an outer circumferential surface of the at least one friction engagement member and may be greater than the outside diameter defined by an outer circumferential surface of the friction engagement member.

(12) The friction brake according to any one of the above forms (1) through (11), wherein the pressing device is configured to press the at least one friction plate against the at least one rotation disc by using an electric motor to move the pressing member forward, and wherein the friction brake comprises a parking-brake mechanism configured to inhibit the electric motor from rotating due to the force in the axial direction which is applied to the pressing member, in a state in which the pressing member is moved forward.

The friction brake may serve not only as a service brake but also as a parking brake.

(13) The friction brake according to any one of the above forms (1) through (12), wherein the pressing device comprises a plurality of pressing members movable in the axial direction.

(14) The friction brake according to any one of the above forms (1) through (13), wherein the friction brake comprises a plurality of friction plates, wherein two friction plates of the plurality of friction plates are respectively located on opposite sides of one of the at least one rotation disc in the axial direction, and wherein the friction brake comprises at least one return spring located between the two friction plates.

For example, the return spring may be provided between engagement protruding portions of the two friction plates.

(15) The friction brake according to any one of the above forms (1) through (14), wherein the at least one rotation disc and the at least one friction plate are located in a space enclosed by the housing, and wherein the friction brake comprises a brake cooling mechanism configured to cool an inside of the space enclosed by the housing.

The friction brake may be of a wet type.

(16) The friction brake according to the above form (15), wherein the brake cooling mechanism is configured to supply cooling liquid from an inner circumferential side to the inside of the space and discharge the cooling liquid from an outer circumferential side, and wherein the brake cooling mechanism comprises a filter configured to remove wearing powder from the cooling liquid to be discharged.

(17) The friction brake according to any one of the above forms (1) through (16), wherein the at least one rotation disc and the at least one friction plate are located in a space enclosed by the housing, and wherein the friction brake comprises a breather plug configured to prevent a pressure in the space enclosed by the housing from becoming excessively high with respect to a pressure outside the space.

(18) A friction brake configured to reduce rotation of a wheel that is driven by a motor unit comprising a drive motor and a speed reducer configured to reduce a speed of rotation of the drive motor, the friction brake comprising:

at least one rotation disc provided so as to be rotatable integrally with an output shaft of one of the speed reducer and the drive motor and movable relative to the output shaft in an axial direction that is a direction of an axis parallel with a rotation axis of the wheel;

at least one friction plate held by a housing so as to be movable relative to the housing in the axial direction such that rotation of the at least one friction plate relative to the housing about the axis is restricted, the housing being a non-rotatable member; and a pressing device configured to press the at least one friction plate against the at least one rotation disc, wherein the pressing device comprises:
a pressing member held by the housing so as to be movable in the axial direction; and
a drive source configured to apply a force in the axial direction to the pressing member.

The drive source in the friction brake according to the present form is configured to apply a force only in the axial direction (which is a force not containing a component in a direction intersecting the axial direction), to the pressing member. The technical features according to any one of the above forms (1) through (17) may be incorporated into the friction brake according to the present form.

(19) A vehicle-mounted apparatus, comprising:
a motor unit comprising a drive motor and a speed reducer configured to reduce a speed of rotation of an output shaft of the drive motor, the motor unit being configured to apply a rotational driving force to a wheel of a vehicle; and a friction brake configured to reduce rotation of the wheel, wherein the friction brake comprises:
at least one rotation disc provided so as to be rotatable integrally with the output shaft of the drive motor and movable relative to the output shaft in an axial direction that is a direction of an axis parallel with a rotation axis of the wheel;
at least one friction plate held by a housing so as to be movable relative to the housing in the axial direction such that rotation of the at least one friction plate relative to the housing about the axis is restricted, the housing being a non-rotatable member; and
a pressing device configured to press the at least one friction plate against the at least one rotation disc.

The technical features according to any one of the above forms (1) through (18) may be incorporated into the vehicle-mounted apparatus according to the present form.

What is claimed is:

1. A vehicle-mounted apparatus, comprising:
a motor unit comprising a drive motor and a speed reducer configured to reduce a speed of rotation of an output shaft of the drive motor, the motor unit being configured to apply a rotational driving force to a wheel of a vehicle; and
a friction brake configured to reduce rotation of the wheel, wherein the friction brake comprises:
at least one rotation disc provided so as to be rotatable integrally with the output shaft of the drive motor;
a housing that is a non-rotatable member;
at least one friction plate held by the housing so as to be movable relative to the housing in an axial direction that is a direction of an axis parallel with a rotation axis of the wheel such that rotation of the at least one friction plate relative to the housing about the axis is restricted; and
a pressing device configured to press the at least one friction plate against the at least one rotation disc,
wherein the housing comprises a first housing having a substantially cylindrical shape having a closed bottom,
wherein the first housing comprises a cylindrical portion and a bottom portion,
wherein the pressing device is held by the first housing, and
wherein a plurality of large-thickness portions each extending radially are provided at the bottom portion of the first housing.

2. The vehicle-mounted apparatus according to claim 1, wherein each of at least one friction plates has a substantially annular-plate shape and comprises a lining as a friction engagement member provided on a facing surface of said each of at least one friction plates in a state in which each lining occupies a central angle of 180 degrees on each facing surface, and each facing surface faces the at least one rotation disc.

3. The vehicle-mounted apparatus according to claim 1, wherein the pressing device comprises:
a pressing member held by the housing so as to be movable in the axial direction; and
a drive source configured to apply a force in the axial direction to the pressing member.

4. The vehicle-mounted apparatus according to claim 3, wherein the pressing device is configured to press the at least one friction plate against the at least one rotation disc by using an electric motor to move the pressing member forward, and wherein the friction brake comprises a parking-brake mechanism configured to inhibit the electric motor from rotating due to the force in the axial direction which is applied to the pressing member, in a state in which the pressing member is moved forward.

5. The vehicle-mounted apparatus according to claim 3, wherein the pressing device comprises a plurality of pressing members each as the pressing member.

6. A vehicle-mounted apparatus, comprising:
a motor unit comprising a drive motor and a speed reducer configured to reduce a speed of rotation of an output shaft of the drive motor, the motor unit being configured to apply a rotational driving force to a wheel of a vehicle; and
a friction brake configured to reduce rotation of the wheel, wherein the friction brake comprises:
   at least one rotation disc provided so as to be rotatable integrally with the output shaft of the drive motor;
   a housing that is a non-rotatable member;
   at least one friction plate held by the housing so as to be movable relative to the housing in an axial direction that is a direction of an axis parallel with a rotation axis of the wheel such that rotation of the at least one friction plate relative to the housing about the axis is restricted; and
   a pressing device configured to press the at least one friction plate against the at least one rotation disc,
wherein the housing comprises a first housing having a substantially cylindrical shape,
wherein a plurality of engagement protruding portions and a plurality of engagement recessed portions are provided at an inner circumferential portion of a cylindrical portion of the first housing,
wherein a plurality of engagement protruding portions and a plurality of engagement recessed portions are provided at an outer circumferential portion of the at least one friction plate, and
wherein engagement between the plurality of engagement protruding portions of the inner circumferential portion of the cylindrical portion of the first housing and the plurality of engagement recessed portions of the outer circumferential portion of the at least one friction plate and engagement between the plurality of engagement recessed portions of the inner circumferential portion of the cylindrical portion of the first housing and the plurality of engagement protruding portions of the outer circumferential portion of the at least one friction plate causes the first housing to hold the at least one friction plate in a state in which the at least one friction plate is movable relative to the first housing in the axial direction, and rotation of the at least one friction plate relative to the first housing about the axis is restricted.

7. A vehicle-mounted apparatus, comprising:
a motor unit comprising a drive motor and a speed reducer configured to reduce a speed of rotation of an output shaft of the drive motor, the motor unit being configured to apply a rotational driving force to a wheel of a vehicle; and
a friction brake configured to reduce rotation of the wheel, wherein the friction brake comprises:
   at least one rotation disc provided so as to be rotatable integrally with the output shaft of the drive motor;
   a housing that is a non-rotatable member;
   at least one friction plate held by the housing so as to be movable relative to the housing in an axial direction that is a direction of an axis parallel with a rotation axis of the wheel such that rotation of the at least one friction plate relative to the housing about the axis is restricted; and
   a pressing device configured to press the at least one friction plate against the at least one rotation disc,
wherein the motor unit comprises a bearing,
wherein the output shaft of the drive motor is rotatably held by the housing with the bearing interposed between the output shaft and the housing,
wherein the bearing comprises:
   an inner race rotatable integrally with the output shaft;
   an outer race fixed to the housing; and
   a plurality of rotatable members provided between the inner race and the outer race,
wherein at least one engagement protruding portion is provided at one of an inner circumferential portion of the at least one rotation disc and an outer circumferential portion of the inner race,
wherein at least one engagement recessed portion is provided at the other of the inner circumferential portion of the at least one rotation disc and the outer circumferential portion of the inner race, and
wherein engagement between the at least one engagement protruding portion and the at least one engagement recessed portion causes the inner race to hold the at least one rotation disc in a state in which the at least one rotation disc is movable relative to the inner race in the axial direction and rotatable about the axis integrally with the inner race.

8. A vehicle-mounted apparatus comprising:
a motor unit comprising a drive motor and a speed reducer configured to reduce a speed of rotation of an output shaft of the drive motor, the motor unit being configured to apply a rotational driving force to a wheel of a vehicle; and
a friction brake configured to reduce rotation of the wheel, wherein the friction brake comprises:
   at least one rotation disc provided so as to be rotatable integrally with the output shaft of the drive motor;
   a housing that is a non-rotatable member;
   at least one friction plate held by the housing so as to be movable relative to the housing in an axial direction that is a direction of an axis parallel with a rotation axis of the wheel such that rotation of the at least one friction plate relative to the housing about the axis is restricted; and
   a pressing device configured to press the at least one friction plate against the at least one rotation disc,
wherein the pressing device comprises a pressing plate provided between the pressing member and one of multiple friction plates which is nearest to the pressing member among the at least one friction plate, and
wherein an outside diameter of the pressing plate is greater than an outside diameter of the pressing member and less than an outside diameter of the at least one friction plate.

9. A vehicle-mounted apparatus comprising:
a motor unit comprising a drive motor and a speed reducer configured to reduce a speed of rotation of an output shaft of the drive motor, the motor unit being configured to apply a rotational driving force to a wheel of a vehicle; and
a friction brake configured to reduce rotation of the wheel, wherein the friction brake comprises:
   at least one rotation disc provided so as to be rotatable integrally with the output shaft of the drive motor;
   a housing that is a non-rotatable member;

at least one friction plate held by the housing so as to be movable relative to the housing in an axial direction that is a direction of an axis parallel with a rotation axis of the wheel such that rotation of the at least one friction plate relative to the housing about the axis is restricted; and a pressing device configured to press the at least one friction plate against the at least one rotation disc, wherein the friction brake comprises a plurality of friction plates as the at least one friction plate, wherein two friction plates of the plurality of friction plates are respectively located on opposite sides of one of the at least one rotation disc in the axial direction, and wherein the friction brake comprises at least one return spring located between the two friction plates.

10. A vehicle-mounted apparatus comprising:

a motor unit comprising a drive motor and a speed reducer configured to reduce a speed of rotation of an output shaft of the drive motor, the motor unit being configured to apply a rotational driving force to a wheel of a vehicle; and a friction brake configured to reduce rotation of the wheel, wherein the friction brake comprises:

at least one rotation disc provided so as to be rotatable integrally with the output shaft of the drive motor;

a housing that is a non-rotatable member;

at least one friction plate held by the housing so as to be movable relative to the housing in an axial direction that is a direction of an axis parallel with a rotation axis of the wheel such that rotation of the at least one friction plate relative to the housing about the axis is restricted; and a pressing device configured to press the at least one friction plate against the at least one rotation disc, wherein the at least one rotation disc and the at least one friction plate are located in a space enclosed by the housing, wherein the friction brake comprises a brake cooling mechanism configured to cool an inside of the space enclosed by the housing, wherein the brake cooling mechanism is configured to supply cooling liquid from an inner circumferential side to the inside of the space and discharge the cooling liquid from an outer circumferential side, and wherein the brake cooling mechanism comprises a filter configured to remove wearing powder from the cooling liquid to be discharged.

11. The vehicle-mounted apparatus according to claim 10, wherein the at least one rotation disc and the at least one friction plate are located in the space enclosed by the housing, and wherein the friction brake comprises a breather plug configured to prevent a pressure in the space enclosed by the housing from becoming excessively high with respect to a pressure outside the space.

* * * * *